United States Patent
Kress et al.

(10) Patent No.: US 10,962,459 B2
(45) Date of Patent: Mar. 30, 2021

(54) NANO-EXTENSIONAL RHEOMETER

(71) Applicant: Max-Planck-Gesellschaft zur Foerderung der Wissenschaften e.V., Munich (DE)

(72) Inventors: Oliver Kress, Goettingen (DE); Marcin Makowski, Falkensee (DE); Tanya Ostapenko, Goettingen (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 182 days.

(21) Appl. No.: 16/033,540

(22) Filed: Jul. 12, 2018

(65) Prior Publication Data

US 2019/0017913 A1  Jan. 17, 2019

(30) Foreign Application Priority Data

Jul. 17, 2017 (EP) .................................... 17181752

(51) Int. Cl.
  *G01N 11/00* (2006.01)
  *G01N 13/02* (2006.01)

(52) U.S. Cl.
  CPC ............ *G01N 11/00* (2013.01); *G01N 13/02* (2013.01); *G01N 2011/008* (2013.01)

(58) Field of Classification Search
  CPC .. G01N 11/00; G01N 13/02; G01N 2011/008; G01N 2203/0089
  USPC .................................. 73/54.01, 54.22, 54.39
  See application file for complete search history.

(56) References Cited

U.S. PATENT DOCUMENTS

| | | | |
|---|---|---|---|
| 5,677,978 | A | 10/1997 | Lewis |
| 6,056,398 | A | 5/2000 | Negishi |
| 6,711,941 | B2 | 3/2004 | Braithwaite |
| 8,056,398 | B2 | 11/2011 | Jakli |
| 2002/0116987 | A1 | 8/2002 | Braithwaite |

(Continued)

OTHER PUBLICATIONS

S. Shalom et al.: A Micropipette Force Probe Suitable for Near-Field Scanning Optical Micro¬scopy, Review of Scientific Instruments 63, 4061 (1992) 4061-4065.

(Continued)

*Primary Examiner* — Benjamin R Schmitt
(74) *Attorney, Agent, or Firm* — Thomas | Horstemeyer, LLP

(57) ABSTRACT

For measuring rheological properties of a liquid sample, the sample is attached to two sample attachment surfaces opposing each other in a pulling direction. The sample attachment surfaces and the liquid sample attached thereto are arranged in a field of view of a light microscope and imaged onto an electronic camera by means of an objective lens of the light microscope. One of the two sample attachment surfaces is pulled away from the other one in the pulling direction, while a plurality of images of the sample attachment surfaces and the sample attached thereto are registered with the camera. For different distances of the two sample attachment surfaces, both a diameter of the liquid sample in a middle between the two sample attachment surfaces and the respective distances of the two sample attachment surfaces are determined from the images registered with the electronic camera during the step of pulling.

20 Claims, 8 Drawing Sheets

(56) References Cited

U.S. PATENT DOCUMENTS

| | | | | |
|---|---|---|---|---|
| 2006/0129341 A1* | 6/2006 | Beetge | ............... | G01N 33/2823 |
| | | | | 702/65 |
| 2009/0255327 A1* | 10/2009 | Jakli | ..................... | G01N 11/16 |
| | | | | 73/54.25 |
| 2015/0338248 A1* | 11/2015 | Kalelkar | ................ | G01N 11/16 |
| | | | | 73/862.624 |

OTHER PUBLICATIONS

M. Anthonisen et al.: Probing Neural Mechanics with a Micropipette Force Sensor, International Science Index, Biomedical and Biological Engineering vol. 4, 0:9, 2017.

R. D. Schulman et al.: Dynamic Force Patterns of an Undulatory Micro Swimmer, Physical Review E 89, 050701 ® (2014).

A. G. McDonnell et al.: Extensional viscosity of copper nanowire suspensions in an aqueous polymer solution, Soft Matter 2015, 11, 8076-8082.

R. Yu et al.: Extensional viscosity of a thermotropic liquid crystalline polymer measured by thread disintegration method, Polymer Testing, vol. 24, No. 4, Jun. 1, 2005, 513-518.

United States Statutory Invention Registration No. H976, published on Nov. 5, 1991, entitled "Apparatus and Method for Measuring Elongational Viscosity of a Polymeric Solution".

\* cited by examiner

NANO-EXTENSIONAL RHEOMETER

CROSS REFERENCE TO RELATED APPLICATIONS

The present application claims priority to German Patent Application EP 17 181 752.1, filed Jul. 17, 2017, entitled "Nano-Extensional Rheometer".

FIELD

The invention relates to a method of measuring rheological properties of a liquid sample, and to an active sample holder and an apparatus for measuring rheological properties of a liquid sample according to this method.

The present inventions implements extensional rheology in which a liquid sample is attached to two attachment surfaces opposing each other in a pulling direction, in which one of the two sample attachment surfaces is pulled away from the other, and in which a diameter of the liquid sample in the middle between the two sample attachment surfaces is measured for different distances of the two sample attachment surfaces. The extensional viscosity of the liquid sample can then be calculated from the diameter of the fluid and the acceleration of the one of the two sample attachment surfaces versus time.

BACKGROUND

United States Statutory Invention Registration H976 (U.S. Pat. No. 0,000,976 H1) discloses a falling cylinder extensional rheometer for measuring the elongational viscosity of a polymeric solution at stretch rates comparable to those associated with an aerodynamic liquid break up. The rheometer consists of an upper cylinder and a lower cylinder, both vertically arranged or oriented and having their longitudinal axis coincidental. A small quantity of liquid is inserted between the ends of the two cylinders that are vertically spaced one above the other. The upper cylinder is held fixed while the lower cylinder rests initially on top of an air cylinder piston. When piston is activated, it quickly retracts downwardly allowing the lower cylinder to fall and stretch the liquid sample adhering between the ends of the upper and lower cylinders. A high speed camera is used to photograph the falling lower cylinder and the ligament stretching.

U.S. Pat. No. 6,711,941 B2 discloses an apparatus and a method for evaluating the rheological properties of Newtonian and non-Newtonian liquids and melts employing the principal of capillary break up following rapid stretching of the fluid between two plates. The apparatus includes two opposed surfaces defining a sample site disposed there between. A liquid sample undergoes an extensional deformation between the opposed surfaces which separate according to a user-defined motion profile. The time profile of the diameter of the liquid filament is monitored and recorded as a function of time. The diameter of the liquid filament is monitored by means of a light source directing a light beam at the sample site and a light detector for sensing light passing through this sample site. The light detector is either implemented as a laser micrometer or a CCD camera. The user-defined motion profile is implemented by a plunger assembly varying the vertical dimension of the sample site and varying the rate of axial movement of one of the opposed surfaces. A sample loading device comprises a syringe-type delivery device. A force transducer for measuring a force exerted on the liquid sample applied by the opposed surfaces is arranged in direct or indirect contact with one of the opposed surfaces.

U.S. Pat. No. 8,056,398 B2 discloses a nanoliter rheometer. The nanoliter rheometer comprises two thin fibers, the ends of which are in close proximity to one another and desirably parallel to one another. The cross section of the fibers is circular, and the end of a motion fiber is located horizontally in front of a stationary fiber. The motion fiber is oscillated by a drive system. A force transferred through a nanoliter size fluid located between the two fiber ends is measured either by an inductance capacitance resistance (LCR) meter or a piezoelectric crystal, and recorded using a lock-in amplifier. The testing procedure is viewed using an optical magnifying device such as a microscope.

U.S. Pat. No. 5,677,978 A discloses a force sensor for measuring nanometer scale surface topography and other characteristics. The force sensor comprises a tapered micropipette having a hollow tip drawn to an inner tip diameter of 10 nanometer or less. The micropipette has a bend near said tip, and it is mounted to produce a cantilevered bend probe structure suitable for normal force sensing. The force sensor further comprises an optically flat polished region near said bend for monitoring deflection of the cantilevered structure.

S. Shalom et al.: A Micropipette Force Probe Suitable for Near-Field Scanning Optical Microscopy, Review of Scientific Instruments 63, 4061 (1992) report that the force sensor according to U.S. Pat. No. 5,677,978 A has a typical force constant 10 N/m for pipettes with diameters of the cantilever in the range of 40-60 µm, which in terms of the achievable dimensionalities of such pipettes, is very large. It is stated that a reduction of two orders of magnitude in this dimensionality should be possible.

M. Anthonisen et al.: Probing Neural Mechanics with a Micropipette Force Sensor, International Science Index, Biomedical and Biological Engineering Vol: 4, 0:9, 2017 disclose a mechanical probe composed of a micropipette with its tip fixed to a functionalized bead. This mechanical probe is used to incite the formation of a neurite in a sample of rat hippocampal neurons while simultaneously measuring the tension in said neurite as the sample is pulled away from the beaded tip. With optical imaging methods, a force resolution of 12 pN is achieved.

R. D. Schulman et al.: Dynamic Force Patterns of an Undulatory Micro Swimmer, Physical Review E 89, 050701 (R) (2014) disclose probing the viscous force involved in the undulatory swimming of the model organism C. elegans. Using micropipette deflection, direct measurements of lateral and propulsive forces produced in response to the motion of the worm were attained. The worm was held at the end of a micropipette. The micropipette extents in one plane and comprises two bends. The deflection of the micropipette is monitored by means of a microscope objective.

There still is a need of an enhanced method of measuring rheological properties of a liquid sample, and an active sample holder and of an apparatus for measuring rheological properties of a liquid sample according to this method, which are implemented easily but nevertheless allow for exactly measuring the rheological properties, i. e. the extensional viscosity of the liquid sample.

SUMMARY OF THE INVENTION

In one aspect, the present invention relates to a method of measuring rheological properties of a liquid sample. The method comprises the steps of attaching the liquid sample to two sample attachment surfaces opposing each other in a pulling direction; arranging the two sample attachment surfaces in a field of view of a light microscope; imaging the two sample attachment surfaces and the liquid sample attached thereto onto an electronic camera by means of an objective lens of the light microscope; pulling one of the two sample attachment surfaces away from the other of the two sample attachment surfaces in the pulling direction; registering a plurality of images of the two sample attachment surfaces and the liquid sample attached thereto with the electronic camera during the step of pulling; and, for different distances of the two sample attachment surfaces, determining both a diameter of the liquid sample in a middle between the two sample attachment surfaces and the respective distances of the two sample attachment surfaces from the plurality of the images registered with the electronic camera during the step of pulling.

In another aspect, the present invention relates to an active sample holder for measuring rheological properties of a liquid sample. The active sample holder comprises two sample attachment surfaces opposing each other in a pulling direction; a pulling drive configured to pull one of the two sample attachment surfaces away from the other of the two sample attachment surfaces in the pulling direction; and an elastic element configured to elastically support the other of the two sample attachment surfaces in the pulling direction and serving as a force sensitive element configured to sense a force exerted on the liquid sample attached to both sample attachment surfaces in the pulling direction. Further, the active sample holder is configured to be placed in a light microscope for imaging the two sample attachment surfaces and the liquid sample attached thereto onto an electronic camera by means of an objective lens of the light microscope.

In yet another aspect, the present invention relates to an apparatus for measuring rheological properties of a liquid sample. The apparatus comprises a light microscope including a sample stage, an objective lens, and a camera connector; an active sample holder arranged on the sample stage; and an electronic camera connected to the camera connector. The active sample holder comprises two sample attachment surfaces opposing each other in a pulling direction; a pulling drive configured to pull one of the two sample attachment surfaces away from the other of the two sample attachment surfaces in the pulling direction; and an elastic element configured to elastically support the other of the two sample attachment surfaces in the pulling direction and serving as a force sensitive element configured to sense a force exerted on the liquid sample attached to both sample attachment surfaces in the pulling direction.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
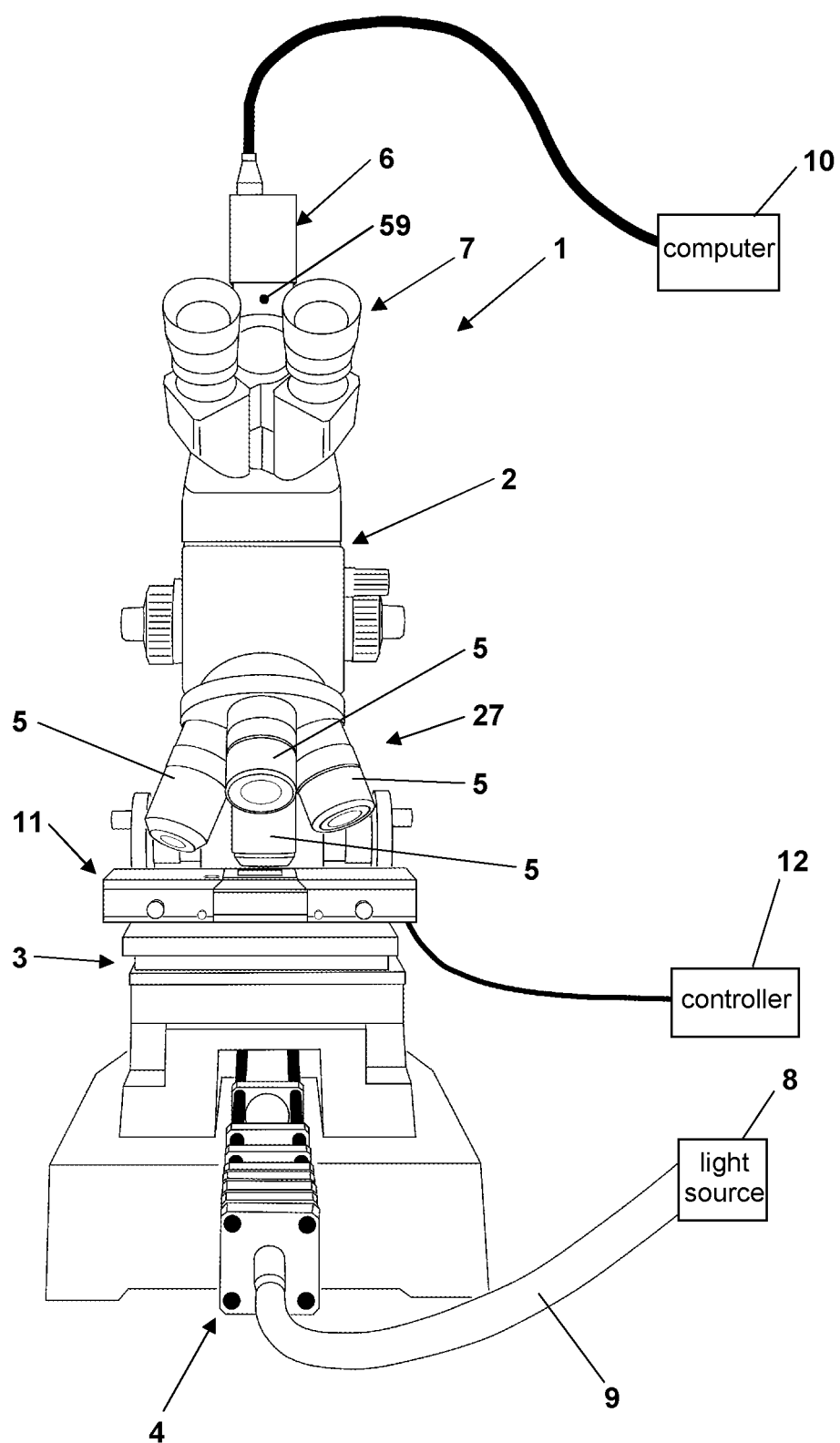
FIG. 1 shows an apparatus according to the present invention.

In a method of measuring rheological properties of a liquid sample according to the present invention, the liquid sample is attached to two sample attachment surfaces opposing each other in a pulling direction. The two sample attachment surfaces are arranged in the field of view of a light microscope, and the two sample attachment surfaces and the liquid sample attached thereto are imaged onto an electronic camera by means of an objective lens of the light microscope. One of the two sample attachment surfaces is pulled away from the other of the two sample attachment surfaces in the pulling direction, while a plurality of images of the two sample attachment surfaces and the liquid sample attached thereto are registered with the electronic camera. A diameter of the liquid sample in the middle between the two sample attachment surfaces is measured for different distances of the two sample attachment surfaces in that the diameter of the liquid sample in the middle between the two sample attachment surfaces and the respective distances of the two sample attachment areas are determined from the plurality of the images.

In the method according to the present invention a rather conventional setup for measuring rheological properties, in which one of two sample attachment surfaces is pulled away from the other while a plurality of images of a liquid sample attached to the sample attachment surfaces are registered, is scaled down. In addition to allowing for measuring very small liquid samples, this scaling down allows for monitoring the liquid sample both with regards to its decreasing diameter in the middle between the two sample attachment surfaces and the respective distances of the two sample attachment surfaces by means of an electronic camera onto which the liquid sample is imaged by means of an objective lens of a microscope. In other words, all data to be evaluated for determining the rheological properties of interest of the liquid sample are obtained from the pictures of the sample taken with the electronic camera. Even the time course according to which one of the two sample attachment surfaces is pulled away from the other of the two sample attachment surfaces can be obtained from the pictures taken with the electronic camera although it will be set by other means. Consequently, the scaled down setup for measuring the rheological properties of the liquid sample, except of the microscope, may be kept very simple without affecting the accuracy which is achieved in measuring the rheological properties. On the other hand, the microscope used in the method according to the present invention may be any microscope already equipped with a camera or having a camera port to which a camera can be attached.

The method according to the invention allows for exactly measuring the rheological properties of the liquid sample and of most viscous and elastic components, which are needed to characterize viscoelastic fluids. These properties and components inter alia include the extensional viscosity, the elastic modulus, the storage modulus, and the poisson ratio.

In an embodiment of the method according to the present invention, the other of the two sample attachment surfaces is supported via an elastic element, and a force exerted on the liquid sample attached to both sample attachment surfaces in the pulling direction is calculated from a characteristic of the elastic element and a translocation of the other of the two sample attachment surfaces determined from the plurality of images. In this embodiment, the pictures taken with the electronic camera are even used to determine the force exerted on the liquid sample in the pulling direction. As a consequence, there is no need to provide a particular force sensor in the measurement setup other than the elastic element supporting the other of the two attachment surfaces.

In a more detailed embodiment of the method according to the present invention, the distance between the two sample attachment surfaces is increased from less than 1 mm by a factor of at least 1.2 to less than 10 mm in pulling the one of the two sample attachment surfaces away from the other of the two sample attachment surfaces in the pulling direction. The starting distance of less than 1 mm may even be smaller, i. e. less than 0.5 mm or less than 0.2 mm. The factor may also be higher, i. e. at least 1.5, for example, and the final distance between the two sample attachment surfaces of less than 10 mm may be smaller, i.e. less than 5 mm or even less than 2 mm. With these figures, the corresponding dimensions of the sample are very small, so that only a small volume of the sample is needed for measuring its rheological properties. Further, the sample may be imaged onto the electronic camera by means of the objective lens of the microscope at a high magnification without getting out of the field of view of the microscope in the step of pulling so that its diameter in the middle between the attachment surfaces and the distance of the attachment surfaces can be determined from the pictures taken with the electronic camera at a high accuracy.

In an embodiment of the method according to the present invention, the images registered with the electronic camera are digital images, and correlations are calculated between pairs of images of the plurality of the images. These correlations indicate the increase of the distance of the attachment surfaces in the pulling direction and the decrease of the diameter in the middle of the liquid sample. Further, they indicate the translocation of the other of the two sample attachment surfaces supported via the elastic element due to the force exerted onto the liquid sample or the corresponding reaction force exerted by the liquid sample onto the other of the two sample attachment surfaces. Thus, the correlations provide for all information of interest to be taken from the pictures of the plurality of the pictures.

An active sample holder of the present invention for measuring rheological properties of a liquid sample according to the method of the present invention comprises two sample attachment surfaces opposing each other in a pulling direction, a pulling drive configured to pull one of the two sample attachment surfaces away from the other of the two sample attachment surfaces in the pulling direction, and a force sensitive element configured to sense a force exerted on the liquid sample attached to both sample attachment surfaces in the pulling direction. This active sample holder is configured to be placed in a light microscope for imagining the two sample attachment surfaces and the liquid sample attached thereto. Particularly, the two sample attachment surfaces and the liquid sample attached thereto are imaged on an electronic camera by means of an objective lens of the light microscope. The force sensitive element is a simple elastic element supporting the other of the two sample attachment surfaces in the pulling direction. The force sensitive element does not need to have any integrated means for registering its elastic deformation, and typically it has no such means. Instead, its elastic deformation is determined from pictures taken with the electronic camera.

In a more particular embodiment of the present invention, the active sample holder is configured to be placed on a sample stage of the light microscope.

In an embodiment of the active sample holder according to the present invention, the other of the two sample attachment surfaces is a surface of the elastic element itself.

The elastic element may be a micro spring. Alternatively or additionally, the elastic element may be made of glass. A pulling element comprising the one attachment surface which is pulled by the pulling drive in the pulling direction may also be made of glass, particularly of the same glass as the elastic element. Thus, both sample attachment surfaces may also be made of glass, particularly of the same glass. Alternatively the elastic element and the pulling element and/or the sample attachment surfaces may be made of any other material suitable for attaching the liquid sample.

The elastic element made of glass may comprise a U-shaped micropipette or non-hollow glass filament with two long limbs running in parallel to each other and orthogonal to the pulling direction and a short limb located between the two long limbs and running in parallel to the pulling direction. With a sufficiently small diameter of the micropipette or filament and with sufficiently long limbs, such a micro spring may display a small spring constant in a range between 1 pN/μm ($=10^{-6}$ N/m) and 10 mN/μm ($=10^{-2}$ N/m) or between 2 pN/μm ($=2\times10^{-6}$ N/m) and 5 mN/μm ($=5\times10^{-3}$ N/m) so that even small forces exerted on the liquid sample result in translocations of the other one of the two attachment surfaces which are easily measured from the pictures taken with the electronic camera through the objective lens of the light microscope.

The pulling element including the one of the two sample attachment surfaces may also be a micropipette or glass filament which linearly extends in the pulling direction.

In a more detailed embodiment of the active sample holder according to the present invention, the pulling drive includes a step linear motor which is configured to be operated in steps of less than 10 nanometer or even less than 5 nanometer or particularly in steps of between 1 and 3 nanometer. For example, the pulling drive includes a piezo-based step linear motor.

An embodiment of the active sample holder according to the present invention includes a positioning device configured to position the other of the two sample attachment surfaces in the pulling direction and/or in at least one direction orthogonal to the pulling direction. The positioning device may also allow for rotating through unlimited range of angles such that the rotation is about the pulling direction, i.e. the liquid sample itself. This positioning device can be used to achieve optimum starting conditions for the method according to the present invention by optimally positioning the other of the two sample attachment surfaces with regard to the one of the two attachment surfaces and the pulling direction.

For example, the positioning device comprises servomotors which are configured to be controlled by means of a joystick. This joystick may be operated by a user of the active sample holder according to the present invention while viewing the two sample attachment surfaces through the objective lens of the microscope.

An embodiment of the active sample holder according to the present invention includes a housing enclosing the two sample attachment surfaces. This housing includes at least one window giving view to the two sample attachment surfaces from outside the housing. The housing may include a further window opposing the at least one window in a direction perpendicular to the pulling direction. This window may be used for illuminating the liquid sample within the active sample holder from outside the active sample holder.

Further, the housing may include a thermal insulation allowing for measuring the rheological properties of the liquid sample at another temperature than the temperature in the surroundings of the active sample holder. The pulling device and the positioning device, if present may be located outside the thermal insulation, so that waste heat generated by the pulling device and the positioning device do not involuntarily increase the temperature within the thermal insulation, and that a lowered or increased temperature inside the thermal insulation does nor affect the positioning device and the pulling drive.

Further, a sample temperature adjusting device may be located in the housing. Such a sample temperature adjusting device may include at least one heating cartridge and/or a peltier element. The temperature adjusting device is configured to adjust the temperature within the housing and thus the temperature of the sample to any desired temperature at which the rheological properties of the liquid sample are to be measured.

An apparatus of the present invention for measuring rheological properties of a liquid sample according to the method of the present invention comprises a light microscope including a sample stage, an objective lens and a camera connector, an active sample holder according to the present invention arranged on the sample stage, and an electronic camera connected to the camera connector of the light microscope. As already pointed out, the light microscope may be any standard light microscope, and the electronic camera may also be a standard electronic camera. However, the active sample holder of the apparatus according to the present invention, although of a rather simple and straight forward construction, is special. The rather simple and straight forward construction of the sample holder is possible, because all relevant information is obtained from the pictures taken with the electronic camera by analyzing these pictures.

Now referring in greater detail to the drawings, the apparatus 1 according to FIG. 1 includes a standard light microscope 2 equipped with a sample stage 3, an illumination device 4 for illuminating a sample arranged on the sample stage 3, an objective changer 27 for selecting between four different objective lenses 5 for imaging the sample arranged on the sample stage 3 onto an electronic camera 6 connected to a camera connector 59, and an ocular 7 for viewing the sample on the sample stage 3 through the objective lens 5 selected at present. The illumination device 4 is connected to an external light source 8 via a light guide 9. The electronic camera 6 is connected to a computer 10 configured to control the camera 6 and evaluate the pictures taken with the camera 6.

Further, the apparatus 1 comprises an active sample holder 11 arranged on the sample stage 3. The active sample holder 11 is connected to a controller 12 which may be implemented by the computer 10 or by one or a plurality of other control devices.

The microscope is used to image a liquid sample which is held by the active sample holder 11 onto the camera 6 and to take pictures of the liquid sample with the camera 6 while the active sample holder 11 increases a distance of two sample attachment surfaces to which the liquid sample is attached in the sample holder 11.

Figure 2:
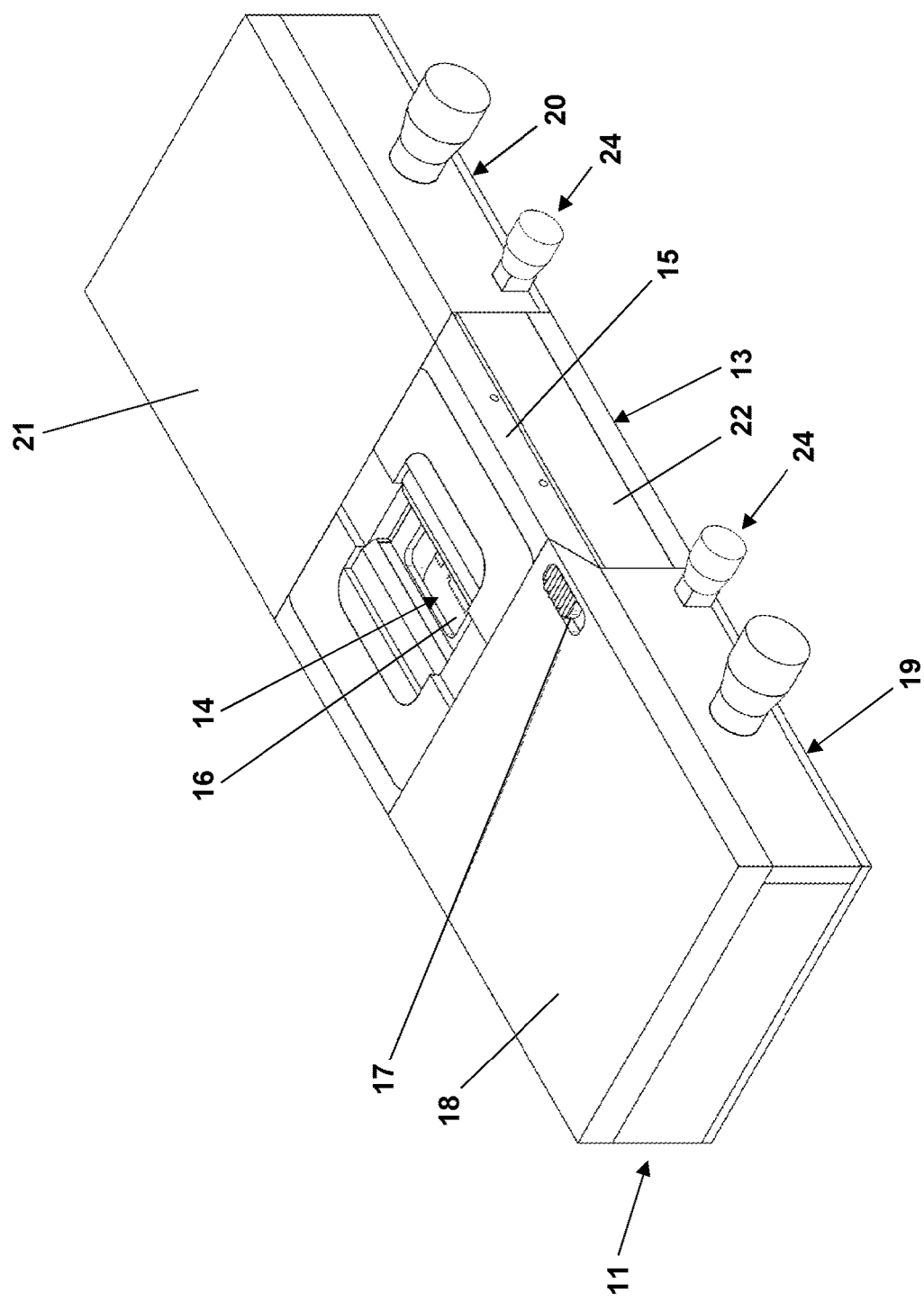
FIG. 2 is a perspective view of an active sample holder according to the present invention.

The sample holder 11 separately depicted in FIG. 2 comprises a central part 13 enclosing a sample chamber 14 covered by a lid 15. The lid 15 includes an upper observation window 16 for viewing into the sample chamber 14. The lid 15 comprises a thermally conductive inner lid to help reducing the temperature gradient across the sample chamber 14 and a thermally insulating outer lid to contain the heat and protect the user, and it may be removed by shifting it in a transverse horizontal direction once a latch 17 has been pulled back to free the lid 15. The latch 17 is guided within a lid 18 of an alignment part 19 of the active sample holder 1. This alignment part 19 is rigidly but releasably attached to the central part 13. On its opposite side facing away from the alignment part 19, a pulling part 20 also having a lid 21 is rigidly but releasably attached to the central part 13. The lids 18 and 21 of the parts 19 and 20 provide for a dovetail transverse guide for the lid 15 of the central part 13.

Figure 3:
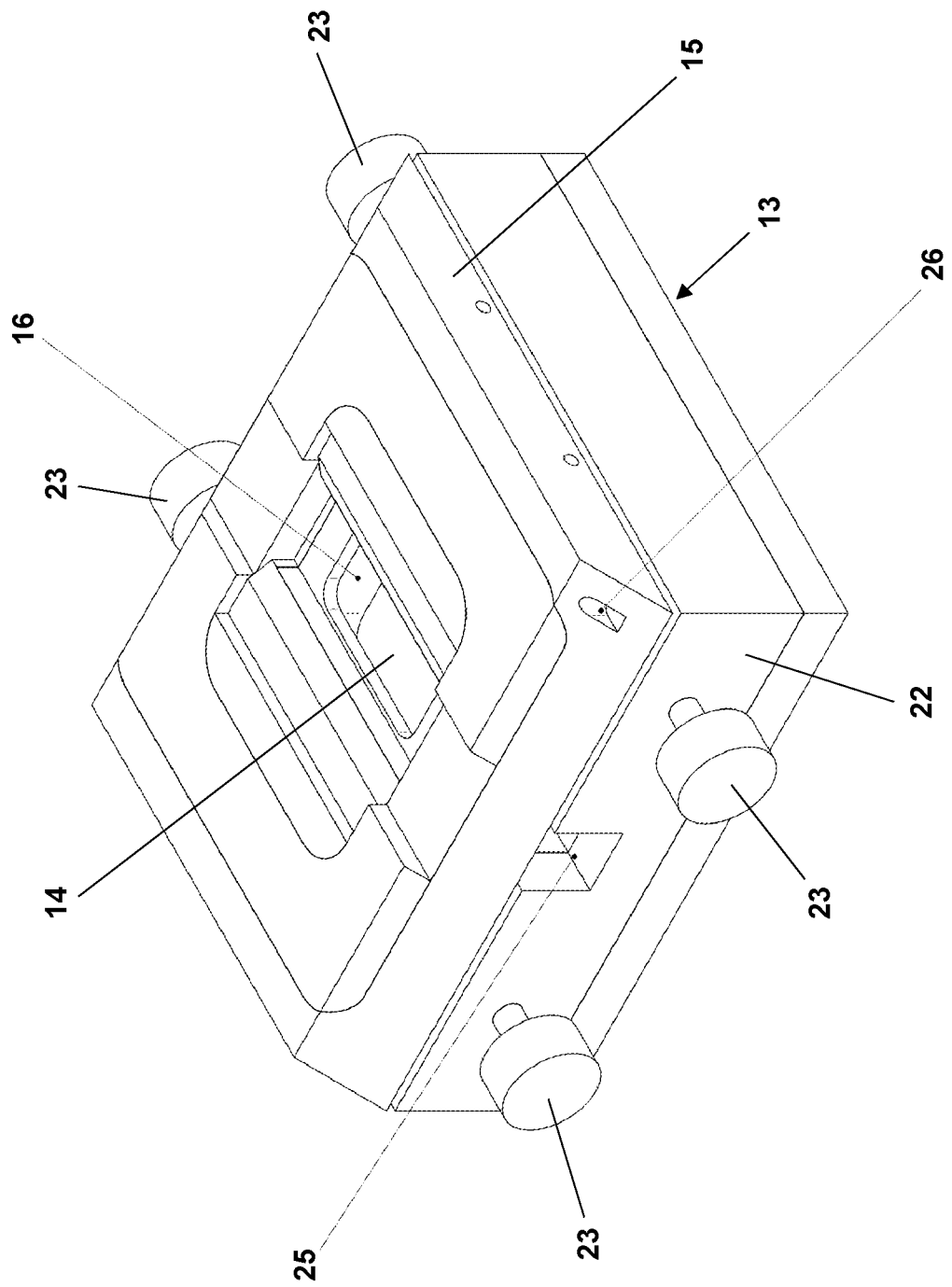
FIG. 3 is a perspective view of a central part of the active sample holder according to FIG. 2.

FIG. 3 separately shows the central part 13 of the active sample holder. A housing 22 of the central part 13 is provided with headed locking pins 23 which are releasably held by locking mechanisms 24 of the alignment part 19 and the pulling part 20, respectively, see FIG. 4. Further, the housing 22 has an access hole 25 in its walls facing the alignment part 19 and the pulling part 20, respectively. Opposite to the latch 17 guided in the lid 18 of the alignment part 19 according to FIG. 2, the lid 15 of the central part 13 is provided with a notch 26.

Figure 4:
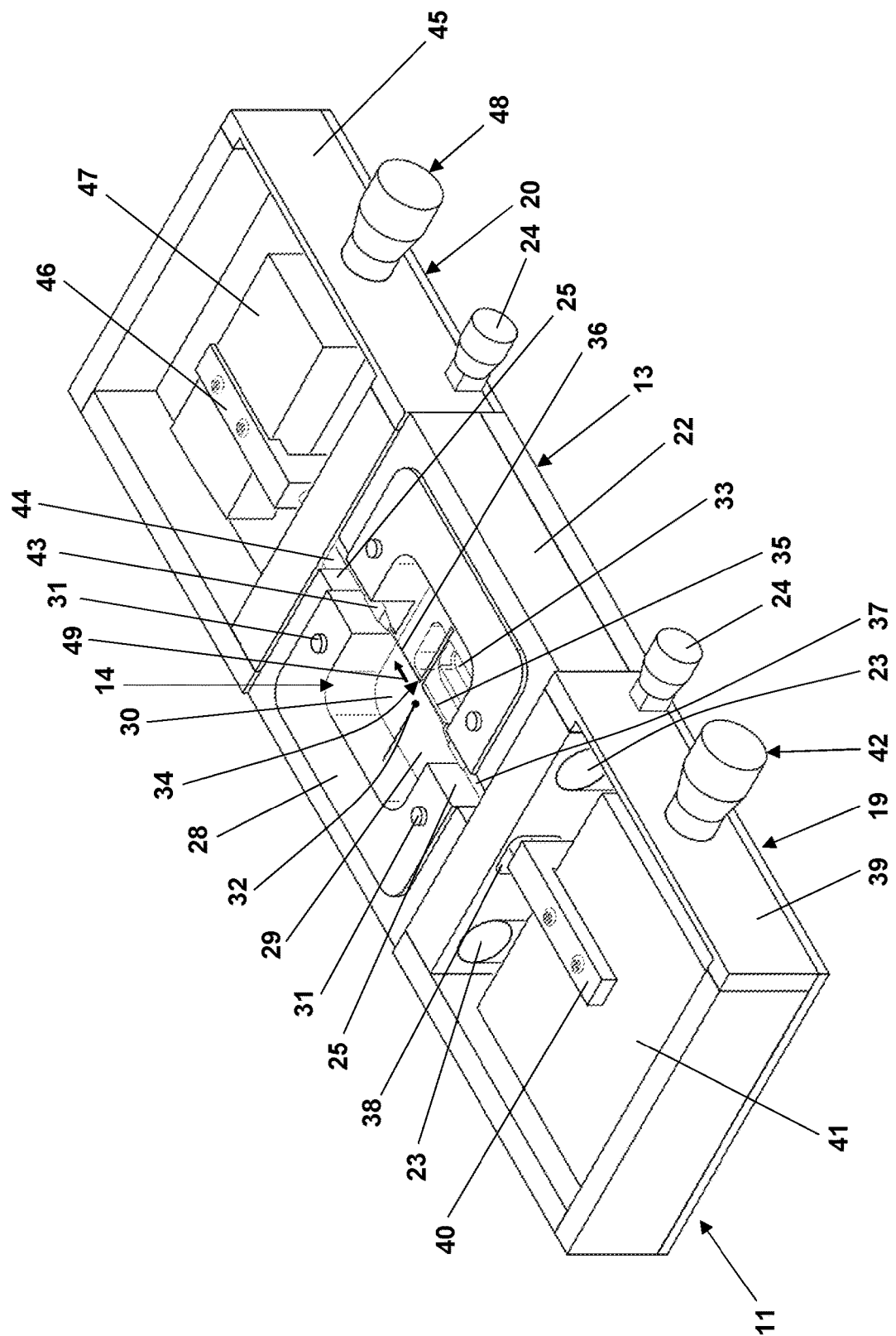
FIG. 4 is a perspective view of an interior of the active sample holder according to FIG. 2.

FIG. 4 shows the active sample holder 11 according to FIG. 2 without the lids 15, 18 and 21 so that the sample chamber 14 in the central part 13 and the interiors of the alignment part 19 and the pulling part 20 are visible. The sample chamber 14 in the housing 22 of the central part 13 is laterally surrounded by a thermal insulation 28. The thermal insulation 28 may, for example, be made of polytetrafluoroethylene (PTFE). The bottom 29 of the sample chamber 14 comprises a copper plate 30. This copper plate 30 is part of a temperature adjusting device further comprising heating cartridges inserted into holes in the copper plate 30. Copper is a very good heat conductor so that the copper plate 30 provides for a uniform temperature distribution over the horizontal cross section of the sample chamber 14. Copper rods 31 vertically passing through the thermal insulation 28 and contacting both the copper plate 30 and the lid 15, see FIGS. 2 and 3, ensure that the lid 15 has about the same temperature as the copper plate 30 so that no relevant vertical temperature gradient is present in the sample chamber 14. A temperature probe 32, like for example a thermocouple, is located close to the center of the sample chamber 14 for monitoring the temperature within the sample chamber 14. The temperature probe 32 allows for a close loop control of this temperature by means of operating the heating cartridges. A lower illumination window 33 provided in the copper plate 30 below the center of the sample chamber 14 allows for illuminating a sample 34 arranged in the sample chamber 14 between attachment surfaces at an elastic element 35 and at a pulling element 36, which will be described in detail with reference to FIG. 5.

The pulling element 36 is fixed to a holder 37 passing through the hole 25 and entering the interior of the alignment part 19 through a corresponding hole 38 in a housing 39 of the alignment part 19. In the housing 39, the holder 37 is attached to a mount 40 of a motorized X, Y, θ positioning device 41. The X, Y, θ positioning device 41 may be operated by a joystick not depicted here for aligning the attachment surface of the elastic element 35 within the sample chamber 14 in X, Y, and θ directions. Additionally, a z-axis adjustment device 42 allows for manually adjusting the vertical z-position of the adjustment surface within the sample chamber 14.

Similarly, the pulling element 36 is connected to a holder 43 passing through the other hole 25 and a corresponding hole 44 in a housing 45 of the pulling part 10 up to a mount 46 of a pulling drive 47. The pulling drive 47 may comprise a piezo-based step linear motor. Further, a manual z-axis adjustment device 48 allows for adjusting the attachment surface of the pulling element 36 in vertical z-direction. The pulling drive 47 is configured to pull the pulling element 36 in a horizontal pulling direction 49 away from the elastic element 35 so that the sample 34 is stretched between the attachment surfaces at the pulling device 36 and the elastic element 35. The time course of the pulling movement of the pulling element 36 in the pulling direction 49 may be voluntarily adjusted by appropriately operating the pulling drive 47.

A liquid sample may be placed into the sample chamber 14 and attached to attachment surfaces at the elastic element 35 and the pulling element 36, for example by means of a syringe (not depicted here) while the lid 15 is removed.

Figure 5:
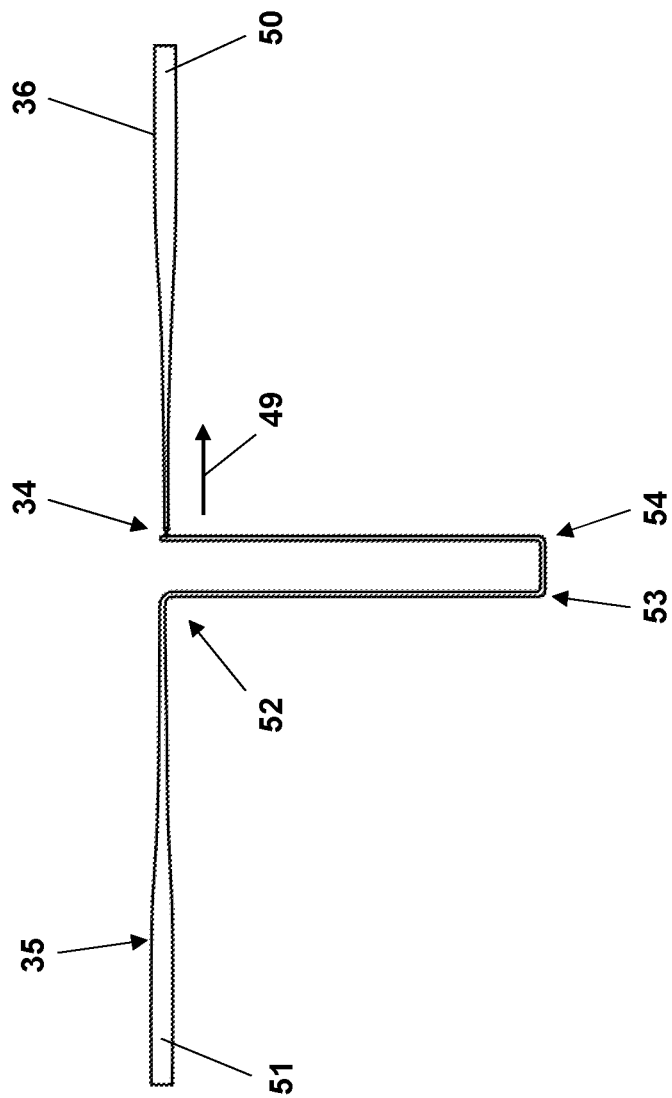
FIG. 5 shows an elastic element and a pulling element of the active sample holder according to FIG. 4.

FIG. 5 separately shows the arrangement of the sample 34 between attachment surfaces provided at the elastic element 35 and the pulling element 36. Both the elastic element 35 and the pulling element 36 are preferably made of glass. The composition of the glass may be selected with regard to its mechanical properties and its surface properties in attaching the sample 34. With regard to the required mechanical properties, the pulling element 36 is not demanding as it merely extends in the pulling direction 49 and tapers from its base 50 towards the sample 34 in opposite direction to the pulling direction 49. The elastic element 35, however, is formed between its base 51 and the sample 34 to provide for a low spring constant. Particularly, the tapered free end of the elastic element 35 has three consecutive 90° bends 52 to 54, here, which allow for an elastic linear stretching of the elastic element 35 between its base 51 and the sample 34 in the pulling direction 49. This linear stretching induces no relevant lateral movement of the attachment surface for the sample 34 in any other direction than the pulling direction 49. The elastic element 35 may be shaped in another way to achieve this linear elasticity. However, the U-shape of the elastic element 35 according to FIG. 5 having two long limbs running in parallel to each other and orthogonal to the pulling direction and a short limb located between the two long limbs and running in parallel to the pulling direction is preferred. Without deviating from this U-shape, the elastic element 35 may comprise a fourth 90° bend so that the tip of the elastic element 35 runs in the pulling direction 49 and faces the tip of the pulling element 36, see FIG. 8.

Figure 6:
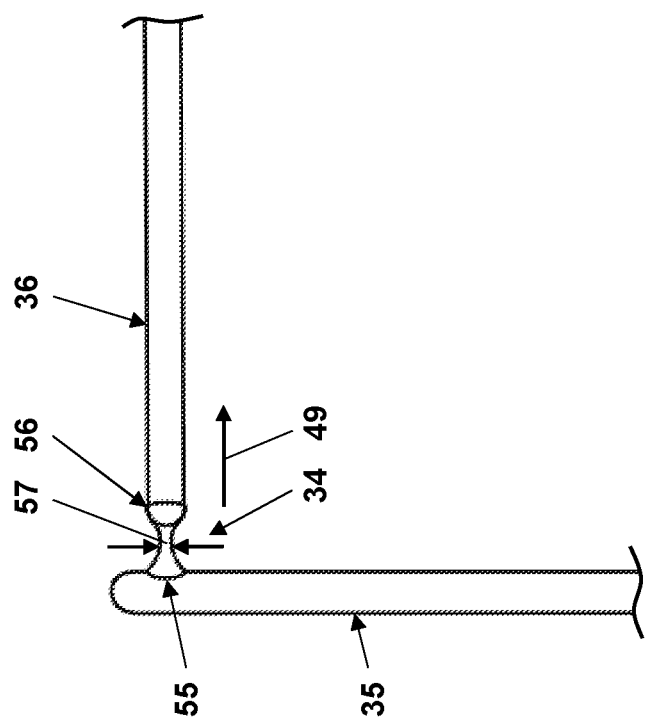
FIG. 6 is a detail of FIG. 5 showing the arrangement of a liquid sample attached to attachment surfaces at the elastic element and at the pulling element.

FIG. 6 shows the tips of the elastic element 35 and the pulling element 36 according to FIG. 5 at an enlarged scale. The sample 34 is attached to an attachment surface 55 provided at the elastic element 35 and to an attachment surface 56 provided at the pulling element 36. The attachment surface 55 is located slightly behind the tip of the elastic element 35, whereas the attachment surface 56 is located at the tip of the pulling element 36. For measuring the rheological properties of the liquid sample 34, the pulling element 36 is pulled away from the elastic element 35 in the pulling direction 49, whereas the distance of the attachment surfaces 55 and 56 and a diameter 57 of the sample 34 in the middle between the attachment surfaces 55 and 56 are monitored by taking pictures with the electronic camera 6 according to FIG. 1. In evaluating these pictures, correlations between successive pictures are determined, which indicate any increase in the distance of the attachment surfaces 55 and 56 and any decrease in the diameter 57.

In addition to allowing for measuring the distance of the attachment surfaces 55 and 56 and the diameter 57 of the sample 34 in the middle between the attachment surfaces 55 and 56, the pictures taken with the electronic camera 6 according to FIG. 1 also allow for determining the force exerted onto the sample 34 in the pulling direction 49. This force translocates the tip of and the attachment surface 55 at the elastic element 35 depending on the spring constant of the elastic element 35. When this spring constant is known or determined separately, the force exerted onto the sample 34 in the pulling direction 49 may be easily calculated from the translocation of the attachment surface 55 seen in the pictures.

Figure 7:
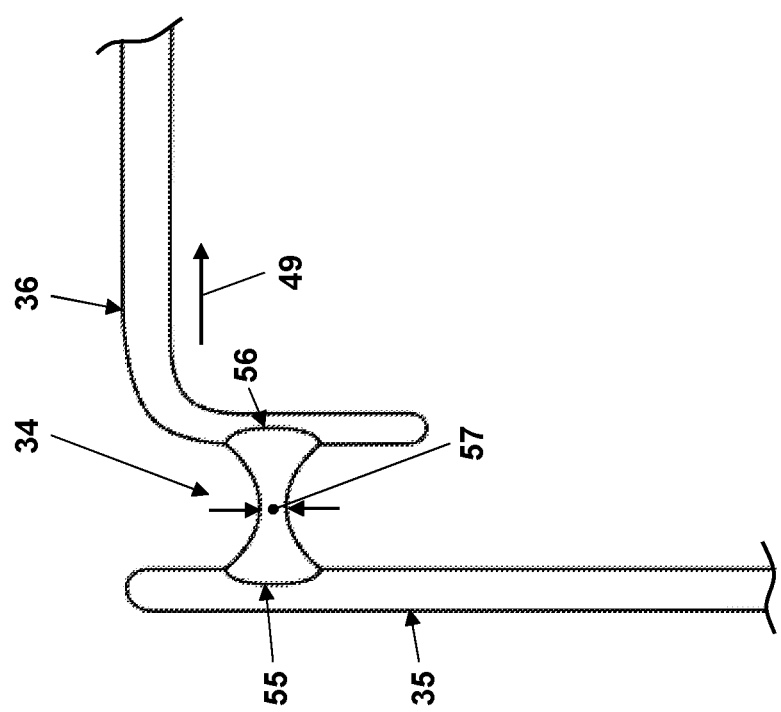
FIG. 7 shows another arrangement of a liquid sample attached to sample attachment surfaces at the elastic element and the pulling element.

In the arrangement of the sample 34 according to FIG. 7, the sample 34 is attached to equal attachment surfaces 55 and 56 at the elastic element 35 and the pulling element 36. To achieve this, the tip of the pulling element 36 is bend to run in parallel to the tip of the elastic element 35. This arrangement allows for very easily determining the distance of the attachment surfaces 55 and 56 as they both laterally extend beyond the sample 34 in the pictures taken with the electronic camera 6.

Figure 8:
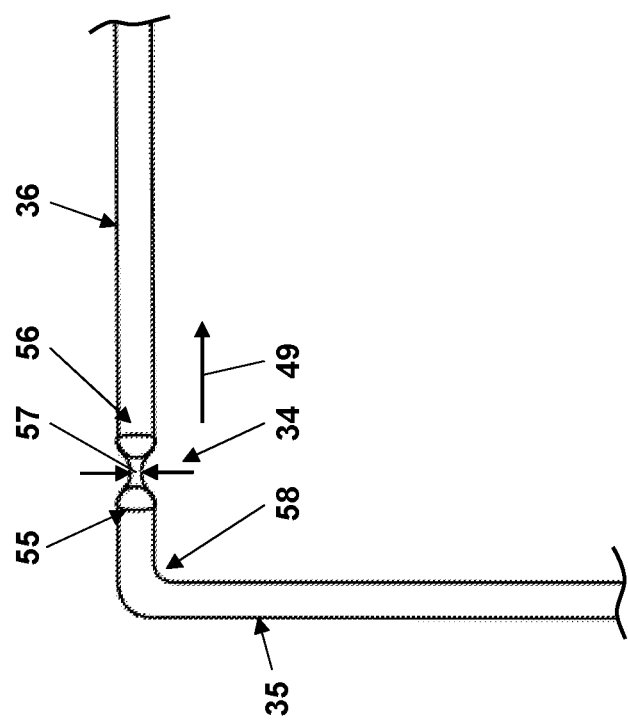
FIG. 8 shows a further arrangement of a liquid sample attached to sample attachment surfaces at the elastic element and the pulling element.

In the arrangement of the sample 34 according to FIG. 8, the sample 34 is attached to attachment surfaces 55 and 56 provided at both the tip of the elastic element 35 and the tip of the pulling element 36. For this reason, the elastic element 35 comprises a further 90° bend 58, see above.

Many variations and modifications may be made to the preferred embodiments of the invention without departing substantially from the spirit and principles of the invention. All such modifications and variations are intended to be included herein within the scope of the present invention, as defined by the following claims.

The invention claimed is:

1. A method of measuring rheological properties of a liquid sample, the method comprising the steps of
    attaching the liquid sample to two sample attachment surfaces opposing each other in a pulling direction;
    arranging the two sample attachment surfaces in a field of view of a light microscope;
    imaging the two sample attachment surfaces and the liquid sample attached thereto onto an electronic camera by means of an objective lens of the light microscope;
    pulling one of the two sample attachment surfaces away from the other of the two sample attachment surfaces in the pulling direction;
    registering a plurality of images of the two sample attachment surfaces and the liquid sample attached thereto with the electronic camera during the step of pulling; and
    for different distances of the two sample attachment surfaces, determining both a diameter of the liquid sample in a middle between the two sample attachment surfaces and the respective distances of the two sample attachment surfaces from the plurality of the images registered with the electronic camera during the step of pulling.

2. The method of claim 1, wherein the step of pulling comprises supporting the other of the two sample attachment surfaces via an elastic element; and wherein the step of determining comprises calculating a force in the pulling direction exerted on the liquid sample attached to both sample attachment surfaces from a characteristic of the elastic element and a translocation of the other of the two sample attachment surfaces determined from the plurality of the images.

3. The method of claim 1, wherein the step of pulling comprises increasing the distance between the two sample attachment surfaces from less than 1 mm by a factor of at least 1.2.

4. The method of claim 1, wherein the step of pulling comprises increasing the distance between the two sample attachment surfaces from less than 0.2 mm by a factor of at least 1.5.

5. The method of claim 1, wherein the step of registering comprises registering a plurality of digital images, and wherein the step of determining comprises calculating correlations between pairs of the plurality of the digital images.

6. A method of use of an active sample holder for measuring rheological properties of a liquid sample, the active sample holder comprising:
two sample attachment surfaces opposing each other in a pulling direction;
a pulling drive configured to pull one of the two sample attachment surfaces away from the other of the two sample attachment surfaces in the pulling direction; and
an elastic element configured to elastically support the other of the two sample attachment surfaces in the pulling direction and serving as a force sensitive element configured to sense a force exerted on the liquid sample attached to both sample attachment surfaces in the pulling direction,
wherein the method comprises the steps of
attaching the liquid sample to the two sample attachment surfaces opposing each other in the pulling direction;
placing the active sample holder in a light microscope such that the two sample attachment surfaces are arranged in a field of view of the light microscope;
imaging the two sample attachment surfaces and the liquid sample attached thereto onto an electronic camera by means of an objective lens of the light microscope;
by means of the pulling drive, pulling one of the two sample attachment surfaces away from the other of the two sample attachment surfaces in the pulling direction;
registering a plurality of images of the two sample attachment surfaces and the liquid sample attached thereto with the electronic camera during the step of pulling; and
for different distances of the two sample attachment surfaces, determining both a diameter of the liquid sample in a middle between the two sample attachment surfaces and the respective distances of the two sample attachment surfaces from the plurality of the images registered with the electronic camera during the step of pulling.

7. The method of use of claim 6, wherein the other of the two sample attachment surfaces is a surface of the elastic element.

8. The method of use of claim 7, wherein the elastic element is a micro spring.

9. The method of use of claim 8, wherein the micro spring is made of glass.

10. The method of use of claim 7, wherein both sample attachment surfaces are made of a same material.

11. The method of use of claim 6, wherein a pulling element including the one of the two sample attachment surfaces is connected to the pulling drive.

12. The method of use of claim 6, wherein the pulling drive includes a step linear motor configured to be operated in steps between 1 and 3 nm.

13. The method of use of claim 12, wherein the pulling drive includes a piezo-based step linear motor.

14. The method of use of claim 6, wherein the active sample holder further comprises a positioning device configured to position the other of the of the two sample attachment surfaces in at least one of the pulling direction and a direction orthogonal to the pulling direction.

15. The method of use of claim 14, wherein the positioning device comprises servo motors which are configured to be controlled via a joystick.

16. The method of use of claim 6, wherein the active sample holder further comprises a housing enclosing the two sample attachment surfaces, the housing including a first window giving view to the two sample attachment surfaces from outside the housing.

17. The method of use of claim 16, wherein the active sample holder further comprises a second window opposing the first window in a direction perpendicular to the pulling direction.

18. The method of use of claim 16, wherein the housing includes a thermal insulation, wherein the pulling drive is located outside the thermal insulation.

19. The method of use of claim 6, wherein the active sample holder further comprises a sample temperature adjusting device including at least one heating cartridge is located in the housing.

20. A method of use of an apparatus for measuring rheological properties of a liquid sample, the apparatus comprising:
a light microscope including a sample stage, an objective lens, and a camera connector;
an active sample holder arranged on the sample stage; and an electronic camera connected to the camera connector,
wherein the active sample holder comprises:
two sample attachment surfaces opposing each other in a pulling direction;
a pulling drive configured to pull one of the two sample attachment surfaces away from the other of the two sample attachment surfaces in the pulling direction; and
an elastic element configured to elastically support the other of the two sample attachment surfaces in the pulling direction and serving as a force sensitive element configured to sense a force exerted on the liquid sample attached to both sample attachment surfaces in the pulling direction,
wherein the method comprises the steps of
attaching the liquid sample to the two sample attachment surfaces opposing each other in the pulling direction;
placing the active sample holder in the light microscope such that the two sample attachment surfaces are arranged in a field of view of the light microscope;

imaging the two sample attachment surfaces and the liquid sample attached thereto onto the electronic camera by means of the objective lens of the light microscope;

by means of the pulling drive, pulling one of the two sample attachment surfaces away from the other of the two sample attachment surfaces in the pulling direction;

registering a plurality of images of the two sample attachment surfaces and the liquid sample attached thereto with the electronic camera during the step of pulling; and for different distances of the two sample attachment surfaces, determining both a diameter of the liquid sample in a middle between the two sample attachment surfaces and the respective distances of the two sample attachment surfaces from the plurality of the images registered with the electronic camera during the step of pulling.

* * * * *